United States Patent [19]
Martinez-Bustos et al.

[11] Patent Number: 5,532,013
[45] Date of Patent: Jul. 2, 1996

[54] METHOD FOR THE PREPARATION OF INSTANT FRESH CORN DOUGH OR MASA

[75] Inventors: Fernando Martinez-Bustos, Orizaba; Juan D. D. Figueroa C., Valle Hermoso; Feliciano Sanchez-Sinencio, Tecamachalco; Jesus Gonzalez-Hernandez, Mexico; Jose D. L. L. Martinez, Puebla; Maximiano Ruiz-Torres, Morelia, all of Mexico

[73] Assignee: Centro de Investigacion y de Estudios Avanzados del I.P.N., Mexico, Mexico

[21] Appl. No.: 326,519

[22] Filed: Oct. 20, 1994

[30] Foreign Application Priority Data

Oct. 21, 1993 [MX] Mexico ................................ 936344

[51] Int. Cl.[6] ............................................. A21D 8/00
[52] U.S. Cl. .......................... 426/496; 426/448; 426/504; 426/516
[58] Field of Search .............................. 426/516, 448, 426/462, 464, 549, 618, 626, 808, 449, 496, 504

[56] References Cited

U.S. PATENT DOCUMENTS

| | | | |
|---|---|---|---|
| 2,584,893 | 2/1952 | Lloyd et al. | 99/93 |
| 2,704,257 | 3/1955 | Diez de Sollano et al. | 99/93 |
| 3,083,103 | 3/1963 | Anderson et al. | 99/80 |
| 3,194,664 | 7/1965 | Eytinge | 99/80 |
| 3,404,986 | 10/1968 | Wimmer et al. | 99/93 |
| 3,859,452 | 1/1975 | Celario Mendoza | 426/375 |
| 4,329,371 | 5/1982 | Hart | 426/461 |
| 4,513,018 | 4/1985 | Rubio | 426/622 |
| 4,594,260 | 6/1986 | Vagueiro et al. | 426/622 |
| 4,748,037 | 5/1988 | Matsumoto et al. | 426/448 |
| 4,756,921 | 7/1988 | Calandro et al. | 426/560 |
| 4,769,251 | 9/1988 | Wenger et al. | 426/459 |
| 4,778,690 | 10/1988 | Sadel, Jr. et al. | 426/448 |
| 4,985,269 | 1/1991 | Irvin et al. | 426/560 |

OTHER PUBLICATIONS

Tonella, Maria Luz, et al., "Physical, Chemical, Nutritional and Sensory Properties of Corn-Based Fortified Food Products," *J. of Food Science*, vol. 48, pp. 1637–1643 (1983).

*Primary Examiner*—George Yeung
*Attorney, Agent, or Firm*—Rothwell, Figg, Ernst & Kurz

[57] ABSTRACT

Instant fresh corn dough or masa may be prepared in short processing times, with low energy consumption and without liquid wastes by extruding a mixture of corn flour, lime and water in an extrusion or kneading chamber until a homogeneous dough is obtained, heating the homogeneous dough to cooking temperature while kneading is continued, expelling the cooked dough through a die from the extrusion chamber to a holding chamber, cooling the dough in said holding chamber and discharging the cooked and cooled dough through a discharge orifice, whereby the total processing time may be reduced to between 1.5 to a maximum of 7 minutes for the preparation of a fully nixtamalized corn dough or masa.

6 Claims, 1 Drawing Sheet

METHOD FOR THE PREPARATION OF INSTANT FRESH CORN DOUGH OR MASA

FIELD OF THE INVENTION

The present invention refers to an apparatus and a continuous method for the manufacture of fresh corn masa (nixtamalized corn dough) and, more particularly, it is related to an extrusion apparatus and a continuous method for the manufacture of fresh corn masa for use in the preparation of tortillas, instant masa flours and derivatives thereof,

BACKGROUND OF THE INVENTION

The history of the corn tortilla is lost in the pre-Columbian time with the ancestors of the native Aztec and Maya peoples. The basic steps in making tortillas has continued unaltered since these times. In fact, the traditional process employed by the first inhabitants of Mesoamerica is still been used today, Corn tortillas are one of the most important food products of Mexico and of some Central American countries. It constitutes the major source of proteins and calories for the lowest social economical groups. At the present time, there is a large expansion in the consumption of tortillas in the U.S.A. as well. Tortillas are also employed as the raw material for the preparation of innumerable traditional food products such as snacks, tortilla chips, taco shells, tostadas, enchiladas, burritos and nachos, all of which are extremely popular in the southern states of the U.S.A. In Mexico and some Central American countries, tortillas, under various types of products, constitute a significant part of the diet of every social strata, with the average annual per capita consumption of 182 Kg. In rural areas they provide approximately 70% of all calories and 50% of all proteins ingested daily, The traditional method of nixtamalization consists in the alkaline cooking of whole corn in water to which 1 to 2% by weight of lime has been added, by heating the mixture to boiling for 30–40 min. and steeping the cooked mixture for 12 to 15 hr. The steeped liquor rich in solids (called nejayote) is discharged. The cooked—steeped maize (called nixtamal) is washed to remove excess of lime and lost pericarp tissue. The nixtamal is ground with a pestle and stone into dough (called masa) and flattened into thin disks that are baked for 30–60 sec on each side on a hot griddle (comal) heated to 180° to 210° C.

In industrial processes corn is cooked using several different cooking and steeping processes. Important process variables are: the type of corn, the cooking time and temperature, the lime concentration, the agitation frequency (which is necessary to keep the lime suspended) and the nixtamal washing procedures. A common procedure for cooking corn uses steam kettles which contain water, lime and corn, into which steam is injected until a temperature near boiling is reached. The cooking water is circulated and the suspension is stirred to suspend the lime. To be used for the manufacture of tortillas the corn is held at near boiling for 30 to 40 minutes; for other uses, such as the manufacture of tortilla chips less time is required.

After cooking, cold water is added and the mixture is steeped for 8 to 12 hr. Afterwards the nixtamal is washed generally using horizontal rotating barrels or drums with the addition of pressurized water in the form of a spray. For the production of fresh masa the nixtamal is washed again and then milled. To prepare tortillas the masa is shaped into circular pieces and baked, generally in a gas oven with conveyor belts heated to a temperature of between 300° and 320° C.

The traditional commercial process for the production of tortillas and dry mesa flours described above as admitted prior art involves excessive time and large floor space, as well as the production of liquid waste. In addition, as a result of the process important nutrients such as thiamin, niacin, riboflavin, fat and fiber are lost. The liquid waste from the cooking process, or nejayote, contains solid particles consisting of fragments of the pericarp (fiber), starch, protein and soluble germ. In addition to the above drawbacks, in some cases subjective determinations and empirical methods used in each step of the process may affect the quality of the final product. All these factors have important economical and commercial implications.

Several research works had been conducted with the objective of making the traditional nixtamalization process more efficient. These mainly consider relationships between concentration of water, corn and lime, the cooking temperature and time, the steeping time of the cooked corn and its milling, without modifying the basic characteristics of the traditional nixtamalization process.

Such works have been described, for instance, in U.S. Pat. No. 2,584,893, patented on February 1952 to Lloyd, W. R. and Millares Sotres, R., which discloses a method for making tortilla flour that includes a stage that comprises the traditional nixtamalization process described above.

U.S. Pat. No. 2,704,257, patented on Mar. 15, 1955 to Diez-de Sollano, C. S. F. and Berriozabal, J. M., discloses a method for producing corn tortilla flour which includes an improvement over the traditional nixtamalization process, by directly converting the wet nixtamal into a dry flour in one single milling and drying step. The traditional cooking and steeping steps, however, continue to be carried out prior to the milling and drying of the nixtamal corn grains, although the steeping step is carried out by the use of perforated drums within which the corn kernels are contained, said drums being immersed into a steeping bath containing the calcium oxide. The main advantage of this method is that of omitting the obtention of a corn dough or masa for further transformation into a flour. The drawbacks shown by the ancient cooking and steeping steps, however, remain substantially unchanged.

Anderson, E. E. and Brown, J. D. describe in U.S. Pat. No. 3,083,103, patented on Mar. 26, 1963, a method that allegedly reduces the treatment time for corn kernels to one tenth as compared with the traditional nixtamalization process. However, Anderson et al use a supersaturated calcium hydroxide solution as the steeping liquor and carry out the steeping operation under high pressure, which obviously require a special type of costly equipment. On the other hand, the supersaturated alkaline steeping bath renders the control of the alkalinity rather difficult and frequently produces an excessively alkaline nixtamal which will create an off-flavor in the finished product. Therefore, this method has not gained popularity in the market.

Eytinge, B. D., U.S. Pat. No. 3,194,654 patented on Jul. 13, 1965, discloses a method for the production of nixtamal which, without departing from the traditional nixtamalization process, renders said process continuous by providing a steeping receptacle at the top of which the corn kernels are continuously fed and at the bottom of which an alkaline steeping solution is fed in counter-current with said kernels and at a suitable cooking temperature to accomplish the nixtamalization of the corn in a time of approximately 5 hours. Although this method represents an improvement over the traditional nixtamalization process, it requires the use of very costly equipment that is difficultly controllable.

U.S. Pat. No. 3,404,986, patented on Oct. 8, 1968 to Wimmer, E. L., Grove, E. and Susek, J. L., discloses a method for producing corn flours suitable for fried snacks, but which would be absolutely unsuitable for the manufacture of tortillas and the like. Wimmer et al use a mechanical method for separating the germ, endosperm and hull of the kernel and then prepare mixtures of whole corn meal and endosperm enriched meal and subject it to the action of hot steel Pollens to cause stanch gelatinization and drying of the meal. Although a masa flour is obtained by this process which can be used for fried snacks, it is not useful for the manufacture of tortillas in view of the absence of an alkaline steeping step which will soften the masa flour as is necessary for making tortilla flour.

Celorio Mendoza, F., U.S. Pat. No. 3,859,452, patented Jan. 7, 1975, describes a method for nixtamalizing whole corn flours by passing a mixture of said flour and lime upwardly through a vertical treating zone by means of an ascending air stream, heating the mixture to release steam from the flour, thus wetting the lime in order to react with the flour and nixtamalize the same, and passing the humid air entrained mixture to a cooling zone to cause reabsorption of the water. This variation of the traditional nixtamalization process, as it may be easily seen, lacks means for controlling the uniformity of the nixtamalization of the treated flour and therefore is incapable or producing a nixtamalized flour with sufficient uniformity for use in the manufacture of tortillas.

Hart, E. R., U.S. Pat. No. 4,329,371, patented on May 11, 1982, describes a method of obtaining corn masa without the use of the alkaline nixtamalization, by providing a step of dehulling the corn grains by means of an extremely complex hydraulic dehusking apparatus, separating the hull from the endosperm and germ portion of the grain, using the hull for other applications, and cooking the endosperm and germ portion with steam. Although this method is capable of obtaining a masa flour perfectly suitable for the manufacture of tortillas, it shows the drawback that the hull must be discarded or used for other purposes of lower economical value.

Tonella, M. L., Sanchez, M. and Salazar, M. G., in Journal of Food Science, Volume 48, 1983, describe on page 1637 a method for obtaining nixtamalized corn flour which uses a slight modification of the traditional nixtamalization process by cooking the suspension of corn and lime at a slightly higher temperature and steeping the suspension for about 24 hours, to then rinse with water and dry the kernels in a tunnel drier and mill the dried kernels in a Ciclotex mill. This method does not depart from the traditional nixtamalization process and therefore does not represent an advance in the art.

U.S. Pat. No. 4,513,018, patented on Apr. 23, 1985 to Rubio, M. J., discloses a continuous method for producing corn flour suitable for making tortillas, taco shells, tortilla chips and the like, which uses a modified nixtamalization process comprising the precooking of corn grains in the presence of lime within a receptacle provided with a screw conveyor. The precooked kernels are then treated with a spray of hot water and are passed to a cooling zone where they remain for a time sufficient to reabsorb a sufficient amount of water. The thus steeped grains are milled and the flour is classified and re-milled until the desired particle size is obtained. This method, although representing an improvement over the traditional nixtamalization process, still must use the same by cooking the grain in an alkaline bath for a considerable period of time.

Vaqueiro, M. C. and Reyes, P. disclose, in U.S. Pat. No. 4,594,260, patented on Jun. 10, 1986, a method of obtaining corn flour including a particular nixtamalization stage which essentially comprises removing the hull from the germ and endosperm of the corn kernel by humidifying, crushing and sieving the integral corn kernels until a fraction containing hull and a fraction containing endosperm and germ are obtained, and then nixtamalizing by the traditional method only the hull fraction and re-mixing the same with the non nixtamalized endosperm and germ fraction. This method, although more efficient than the traditional methods in view of the fact that only a small fraction of the corn kernel has to be nixtamalized, requires a rather elaborate equipment and takes a relatively long time to effect full nixtamalization of the hull fraction, As it may be seen from the above, the prior art methods for the production of corn dough or masa involve excessive time and large floor space, as well as the production of large amounts of liquid waste. In addition, important nutrients such as thiamin, niacin, riboflavin, fat and fiber are lost, With the aim of solving the above described problems shown by the traditional nixtamalization process and the modifications thereof, some workers have developed certain manners of cooking by extrusion cereal grains, Thus, Matsumoto, Y. and Taguchi, G. describe in U.S. Pat. No. 4,748,037, patented on May 31, 1988, a cooker-extruder which utilizes the grains as they are, without a previous crushing step, and treats said grains, under controlled humidity conditions, by means of a twin-screw extruder under a relatively high temperature and expelling the crushed cooked grain through a die, Although corn kernels are mentioned as one of the cereals which may be treated in this cooker-extruder, the description is not enabling towards said grains, and it may be assumed that the corn grains must be used after a dehulling operation is carried out, because the conditions of cooking and extrusion would not be able in themselves to nixtamalize the hulls of corn grains.

In U.S. Pat. No. 6,756,921, patented on Jul. 12, 1988 to Calandro, T., Straks, R. and Verrico, M., a similar twin-screw cooker extruder is described, in which different types of cereal brans are used, including corn (maize) bran. This cooker-extruder works under high shear forces which unduly heat the material under treatment, which obviously brings about difficulties in the control of the process in order to avoid scorching, and is generally intended for treating mixtures of bran and syrup by means of a high shear blending zone, a cooking zone and a cooling zone, from which the paste is discharged through a die having perforations of predetermined size and shape in order to directly form cereal nuggets.

U.S. Pat. No. 6,769,251, patented on Sep. 6, 1988 to Wenger, M. L. and Huber, G. R. describes a cooker-extruder specially designed for obtaining cooked rice products and comprising a preconditioning zone where the rice grains are precooked, a cooking zone where the mass of grains are heated, a vent or vacuum zone to apply a vacuum to cool the rice, and a forming zone containing a die of predetermined size and shape to obtain an extruded rice product. This cooker-extruder, however, is not suitable for the treatment of corn in view of the rather special characteristics thereof.

Finally, U.S. Pat. No. 4,985,269, patented on Jan. 15, 1991 to Irvin, S. A., Foder, R. A. and Merritt, C. G., describes a twin-screw high shear cooker extruder to which corn kernels and lime-water are fed. The extruder contains a first section where mixing and blending is effected under low shear and low compression, a second section which is one of intense mixing, shearing and kneading and where cooking is carried out by the provision of heat mainly originated from the high shear forces to which the dough is subjected, supplemented by heat from an external source, and a third low shear section where the dough is cooled prior to discharge through the die of the extruder in order to avoid expansion of the dough after leaving the die. This extruder is highly suitable for the production of a rather compact, non expanded dough useable For the preparation of tortilla chips, but which could hardly be used for the production of puffed tortillas.

Referring in general terms to the above discussed prior art cooker-extruders, it is to be noted that the screw is probably the most important part of the extruder as it governs not only the degree of cooking and gelatinization but also the quality of the final product. The most drastic changes in the cooking-extrusion process are due to changes in the geometry of the screw. The performance, efficiency and capabilities of an extruder depend to a large extent on the design of the screw and the screw sleeves which govern the flow mechanism of the material in the extruder. Generally speaking, in the prior art extruders mentioned above, the screw is divided into several zones with differing pressure and with a compression ratio higher than 1, and where the shear and pressure are increased in order to accelerate the cooking of the product.

Although the above described prior art cooker-extruders are capable of producing either instant corn flour or instant corn dough or masa in very short times and with a quality suitable for the obtention of tortilla chips and the like, they are not suitable for obtaining a soft dough having the special characteristics necessary to produce table tortillas or even taco shells, whereby an extruder capable of producing such a nixtamalized corn dough or masa was still unavailable in the market.

OBJECTS OF THE INVENTION.

Having in mind the defect of the prior art methods and extruders for the preparation of corn dough or flour, it is an object of the present invention to provide a continuous method for the preparation of fresh corn dough or masa, which will be capable of producing a high quality dough with the use of short processing times.

It is another object of the present invention to provide a continuous method of the above described character, which will require the use of small amounts of processing water and will have low energy requirements for a high yield of the product.

One other object of the present invention is to provide an extrusion apparatus for the continuous production of fresh corn dough or masa, which will be of a relatively simple construction and yet of a high yield of the product.

A more specific object of the present invention is to provide an extruder of the above mentioned character, which will have a low energy consumption per unit of product.

Another object of the present invention is to provide an extruder of the above mentioned character, which will facilitate the incorporation of nutrients and additives in the dough.

The foregoing objects, as well as others ancillary thereto are preferably accomplished as follows:

According to a preferred embodiment of the present invention, a continuous method for the obtention of fresh corn dough or masa comprises the steps of:

a) milling corn kernels in order to obtain a corn flour having a particle size suitable for the manufacture of tortillas;

b) admixing the thus obtained flour with lime and water in amounts sufficient to provide from about 25 to about 60% by weight of moisture and a pH of from about 6 to about 7.5;

c) subjecting the mixture to kneading by extrusion under a relatively low compression and shear rate for a period of time of from about 0.5 to about 5 minutes;

d) heating the kneaded dough to a temperature of from about 60° to about 95° C. for a period of time of from about 1 to about 2 minutes;

e) cooling the heated and cooked dough until a temperature of from about 40° to about 70° C. is reached; and f) expelling the cooled dough through a die in order to obtain a homogenized fresh corn dough or masa.

BRIEF DESCRIPTION OF THE DRAWINGS

The novel features that are considered characteristic of the present invention are set forth with particularity in the appended claims. The invention itself, however, both as to its organization and its method of operation, together with additional objects and advantages thereof, will best be understood from the following description of a specific embodiment when read in connection with the accompanying drawing, in which:

DETAILED DESCRIPTION

Figure 1:
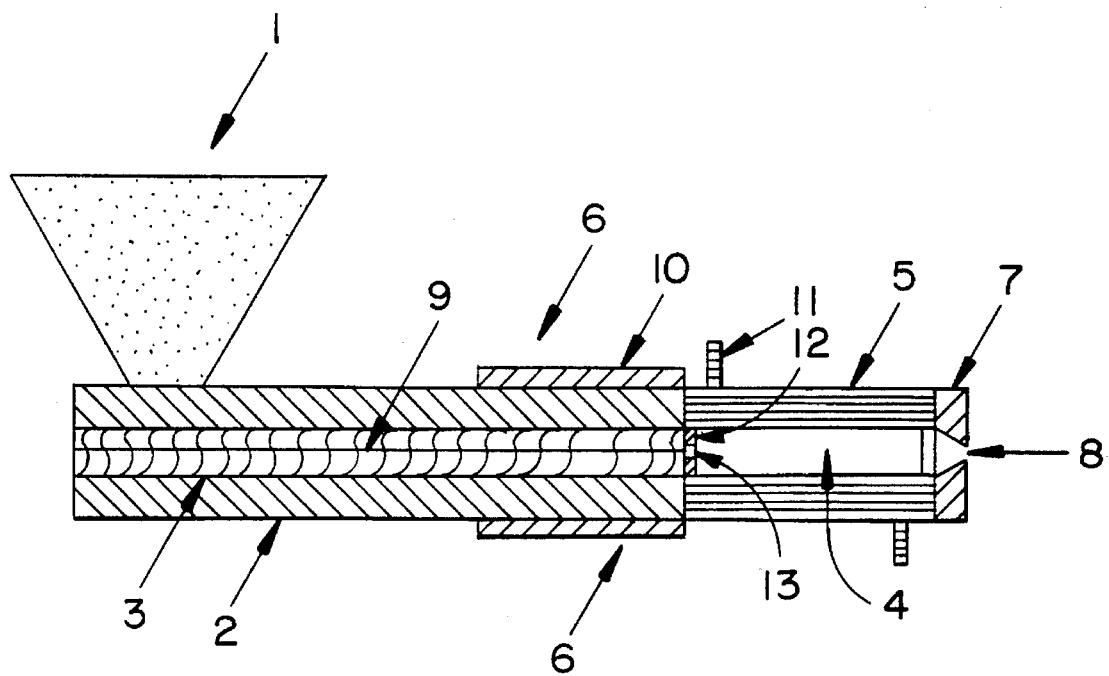
FIG. 1 is a schematic cross sectional elevational view of a cooker-extruder built in accordance with the principles of the present invention.

Having now more particular reference to the drawing, there is shown a cooker extruder built in accordance with the present invention, which essentially comprises a feed hopper 1 preferably provided with a stirrer (not shown) to receive and admix corn flour obtained by milling corn kernels, lime and water in suitable proportions; a cylindrical extrusion or kneading chamber 2 provided with a screw conveyor 9 which may be of the single or multiple screw type, said extrusion chamber 2 being provided with a constant depth channel or barrel 3 to contain the screw conveyor 9, and the latter being of a design and having a rotational speed suitable for providing only a low shearing of the material and also a low compression ratio, which may vary from 1:1 to 1.5; a heating jacket 10 surrounding the discharge portion of the extruder 2, in order to form a cooking section 6; a die or matrix 12 placed at the discharge end of the screw conveyor 9 and provided with a suitable orifice 13 for discharging the dough at a suitable rate and at the same time for providing a counterpressure to the screw 9 in order to maintain the desired degree of compression throughout the extruder; a holding chamber 4 provided with a cooling jacket 5 provided with heat dissipation fins such as indicated at 11; and a die 7 having a discharge nozzle 8 provided at the discharge end of the holding or cooling chamber 4.

Although it is preferred to provide a screw 9 of the single screw type having a constant pitch and a cylindrical shape for the apparatus of the present invention, it is perfectly possible to use, without detriment of the quality of the product obtained, a screw of the multiple screw type and having a tapered shape, provided that a changing pitch is provided in order to maintain a constant low shear and a constant compression ratio throughout the length of the screw.

In order to produce fresh corn dough or masa of a quality suitable for making tortillas, whole or dehulled corn grains are milled to obtain a flour having a particle size distribution appropriate for tortillas and derivatives which are based on fresh masa. The preferred particle size distribution for the above purpose is of between 0.1 to 0.5 mm, depending on the subsequent use desired for the corn dough obtained by the method of the present invention. The raw corn flour obtained is then homogeneously mixed in the feed hopper 1 with sufficient amounts of lime and water, for instance, by the introduction into said hopper 1 of a suitable stirrer or kneader (not shown), said amounts being sufficient to obtain a mixture containing from about 25 to about 60%, and preferably from about 50 to about 60% by weight of moisture and a pH of from about 6 to about 7.5. In order to obtain the above pH, it is generally necessary to add to the corn flour a proportion of from about 0.1 to about 2.5% of lime. It is to be noted that if a dehulled corn grain is used, lower amounts of lime will be required as compared to those that must be used with whole corn grain flour, since the nixtamalization of the endosperm and germ with only minor proportions of hull, requires less energetic conditions. On the other hand, if the fresh corn dough to be produced is intended for the preparation of corn flour, then lower amounts of water are convenient in order to avoid the use of large amounts of energy to evaporate the water.

The mixture is then admitted in the channel 3 of the extruder 2, where it is subjected to the action of the screw 9, which is preferably a straight screw of the single screw type, although multiple screw type conveyors may also be used, said screw 9 being rotated at a speed such that a low shearing action is exerted on the mixture and the channel 3 is provided with a constant depth in order to produce a compression ratio not higher than 1:1.5 and preferably of from about 1:1 to about 1:1.5. The rotational speed of the screw 9 is such that the mixture will need from about 0.5 to about 5 minutes to pass through the length of the extruder 2 prior to entering the heating zone 6. The barrel of the extruder 2 is preferably provided with longitudinal grooves throughout the length of the inner wall thereof in order to prevent the dough to slip on said inner wall, with which a uniform shearing action is obtained.

The screw 9 conveys the mass to the heating zone 6, where the dough is heated to a temperature of from about 60° to about 95° C. in order to produce the required degree of gelatinization to make a fresh masa of good characteristics. The heating jacket 10 is operated so as to supply heat only sufficient to complement the heat produced by the shearing and compression forces produced by the screw 9, such that the above mentioned temperature be obtained. The residence time of the dough within the heating zone 6 is of from about 1 to about 2 minutes. This stage is the most critical of the method, since small variations in the amount of heat generated in or supplied to the corn dough may cause, with excess cooking, the formation of a sticky and gummy dough or, with insufficient cooking, the formation of a crumby and off-taste dough.

The nixtamalized corn dough thus produced is then discharged at the end of the screw 9 through the orifice 13 of the die 12 to the channel of the holding zone 4 where, with the aid of the cooling jacket 5, the dough is cooled to a temperature of from about 40° to about 70° C., preferably of between 45° and 60° C. and most preferably between 50° and 55° C.

The cooled nixtamalized fresh corn dough or mesa is thereafter discharged from the cooker-extruder through a suitable die 7 containing a nozzle 8 for further use in the manufacture of tortillas, nixtamalized corn flour, tortilla chips, snacks and the like. The tortillas obtained with this fresh mesa generally have a moisture content of 40–50%.

In accordance with the above description of the cooker-extruder of the present invention, as well as its mode of operation, it may be concluded that the method for the preparation of nixtamalized fresh corn dough or masa in accordance with this invention essentially comprises the following steps:

a) milling whole or dehulled corn kernels in order to obtain a corn flour having a particle size suitable for the manufacture of tortillas, such as a particle size of from about 0.1 to about 0.5 mm;

b) admixing the thus obtained flour with lime and water in amounts sufficient to provide from about 50 to about 60% by weight of moisture and a pH of from about 6 to about 7.5;

c) subjecting the mixture to kneading by extrusion under a relatively low compression and shear rate for a period of time of from about 0.5 to about 5 minutes;

d) heating the kneaded dough to a temperature of from about 60° to about 95° C. for a period of time of from about 1 to about 2 minutes;

e) cooling the heated and cooked dough until a temperature of from about 40° to about 70° C. is reached; and f) expelling the cooled dough through a die in order to obtain a homogenized fresh corn dough or masa.

The present invention will be more fully understood by way of the following examples, that are given with a merely illustrative and non limitative purpose.

EXAMPLE 1

This example is intended to describe the method followed to obtain fresh masa and tortillas from whole corn kernels. Initially clean raw whole corn kernels were milled and the whole corn flour obtained was allowed to flow by gravity into a mixing device providing a uniform and homogeneous admixing action, where water and lime (calcium hydroxide) in amounts sufficient to provide 60% by weight of moisture and 0.5% by weight of calcium hydroxide to the mixture were added. The resulting mixture, having a moisture content of 60% by weight and a pH of 7.5 was then fed into a cooker-extruder of the present invention.

The flights of the screw of the extruder conveyed the mixture down the barrel thereof, pressing it at a compression rate of 1:1.2 through a die which permitted the passage of the masa into the holding chamber which had at its exit end an orifice through which the fresh masa was discharged. The screw speed was of 35 rpm, and the temperature of the cooking zone was 80° C. The moisture content of the fresh masa thus obtained was of 58% by weight. The residence time of the materials within the apparatus was of 1.5 minutes. A fresh masa having very good plasticity and consistency was obtained.

The fresh masa was used to prepare tortillas that had a moisture content of 53% by weight, a pH of 7.0, a protein content of 10.0% and an ash content of 1.3%.

EXAMPLE 2

This example is intended to describe the method followed to obtain fresh masa and tortillas from dehulled corn kennels. Whole corn kennels (with its inherent moisture content) were subjected to an attrition process in order to partially remove pericarp and germ, leaving approximately 7% of external layers. The dehulled grains were milled and the flour obtained was allowed to flow by gravity into a device providing a uniform and homogeneous admixing action, where water and lime (calcium hydroxide) were added in amounts sufficient to provide 60% by weight of moisture and 0.2% by weight of calcium hydroxide. The resulting mixture, containing 60% of moisture and a pH of 7.0 was delivered into the extruding chamber of the cooker-extruder of the present invention.

The flights on the screw of the extruder conveyed the mixture down the barrel thereof pressing it under a compression hate of 1:1 through a die which permitted the passage of the masa into the holding chamber which had at its discharge end an orifice through which the fresh masa was discharged fop preparation of tortillas. The screw speed was of 35 rpm, and the temperature of the cooking zone was of 80° C. The moisture content of the fresh masa was 58%. The residence time of the raw materials within the apparatus was 1.5 minutes.

The fresh masa was used to prepare tortillas that had a moisture content of 53%, a pH of 7.0, a protein content of 9.7% and an ash content of 1.2%.

EXAMPLE 3

This example is intended to describe the method followed to obtain fresh masa and instant masa flours to prepare tortillas, from whole corn kernels. Initially clean raw whole corn kernels were milled and the whole corn flour obtained was allowed to flow by gravity into a mixing device providing a uniform and homogeneous admixing action, where water and lime (calcium hydroxide) in amounts sufficient to provide 30% by weight of moisture and 0.5% by weight of calcium hydroxide to the mixture were added. The resulting mixture, having a moisture content of 30% by weight and a pH of 7.5 was then fed into a cooker-extruder of the present invention.

The flights of the screw of the extruder conveyed the mixture down the barrel thereof, pressing it at a compression rate of 1:1.2 through a die which permitted the passage of the masa into the holding chamber which had at its exit end an orifice through which the fresh masa was discharged. The screw speed was of 35 rpm, and the temperature of the cooking zone was 80° C. The moisture content of the fresh masa thus obtained was of 28% by weight. The residence time of the materials within the apparatus was of 1.5 minutes. A fresh masa having very good plasticity and consistency was obtained.

The fresh masa was cut into small pieces, milled and dehydrated to obtain an instant whole masa flour, which was then rehydrated to prepare tortillas. The instant whole masa flour obtained in this example had a moisture content of 10.5%, a pH of 7.0, a protein content of 10.0% and an ash content of 1.3%.

EXAMPLE 4

This example is intended to describe the method followed to obtain fresh masa and instant masa flours to prepare tortillas, from dehulled corn kernels. Whole corn kernels (with its inherent moisture content) were subjected to an attrition process in order to partially remove pericarp and germ, leaving approximately 7% of external layers. The dehulled grains were milled and the flour obtained was allowed to flow by gravity into a device providing a uniform and homogeneous admixing action, where water and lime (calcium hydroxide) were added in amounts sufficient to provide 30% by weight of moisture and 0.2% by weight of calcium hydroxide. The resulting mixture, containing 30% of moisture and a pH of 7.0 was delivered into the extruding chamber of the cooker-extruder of the present invention.

The flights on the screw of the extruder conveyed the mixture down the barrel thereof pressing it under a compression rate of 1:1 through a die which permitted the passage of the mesa into the holding chamber which had at its discharge end an orifice through which the fresh mesa was discharged for preparation of tortillas. The screw speed was of 35 rpm, and the temperature of the cooking zone was of 80° C. The moisture content of the fresh mesa was 28%. The residence time of the raw materials within the apparatus was 1.5 minutes.

The fresh mesa was cut into small pieces, milled and dehydrated to obtain an instant mesa flour, which was then rehydrated to prepare tortillas. The instant mesa flour obtained in this example had a moisture content of 10.5%, a pH of 7.0, a protein content of 9.7% and an ash content of 1.2%.

Although certain specific embodiments of the present invention have been described above, it must be understood that many modifications thereof are possible. The present invention, therefore, is not to be restricted insofar as is necessitated by the prior art or by the spirit of the appended claims.

What is claimed is:

1. A method for the preparation of fresh corn dough or masa for use in the preparation of tortillas which comprises the steps of:
   a) milling corn kernels in order to obtain a corn flour having a particle size suitable for the manufacture of tortillas;
   b) admixing the thus obtained flour with lime and water in amounts sufficient to provide from about 25 to about 60% by weight of moisture and a pH of from about 6 to about 7.5;
   c) subjecting the mixture to kneading by extrusion under low compression and shear rate for a period of time of from about 0.5 to about 5 minutes;
   d) heating the kneaded dough to a temperature of from about 60° to about 95° C. for a period of time of from about 1 to about 2 minutes;
   e) cooling the heated and kneaded dough until a temperature of from about 40° to about 70° C. is reached; and
   f) expelling the cooled dough through a die in order to obtain a homogenized fresh corn dough or masa.

2. A method according to claim 1 wherein said corn kernels ape whole corn kernels.

3. A method according to claim 1 wherein said corn kernels are dehulled corn kernels.

4. A method according to claim 3 wherein said dehulled corn kernels are partially dehulled corn kennels.

5. A method according to claim 1 wherein the corn kernels are milled to produce a corn flour having a particle size distribution of between about 0.1 and about 0.5 mm.

6. A method according to claim 1 wherein the kneading of the mixture in step (c) is carried out under a compression ratio of from about 1:1 to about 1:1.5.

* * * * *

UNITED STATES PATENT AND TRADEMARK OFFICE
CERTIFICATE OF CORRECTION

PATENT NO. : 5,532,013
DATED : July 2, 1996
INVENTOR(S) : Fernando Martinez-Bustos et al.

It is certified that error appears in the above-indentified patent and that said Letters Patent is hereby corrected as shown below:

Col. 3, line 12, "Pollens" should be -- rollers --; Col. 4, line 40, "6,756,921" should be -- 4,756,921 --; Col. 4, line 54, "6,769,251" should be -- 4,769,251 --; Col. 7, line 65, "mesa" should be -- masa --; Col. 8, line 3, "mesa" should be -- masa --; Col. 10, line 9, "mesa" should be -- masa --; Col. 10, line 14, "mesa" should be -- masa --; Col. 10, line 17, "mesa" should be -- masa --; Col. 10, line 18, "mesa" should be -- masa --; Col. 10, line 19, "mesa" should be -- masa --.

Signed and Sealed this

Twenty-fifth Day of February, 1997

Attest:

BRUCE LEHMAN

*Attesting Officer*          *Commissioner of Patents and Trademarks*